United States Patent Office 3,562,345
Patented Feb. 9, 1971

3,562,345
CRYSTALLINE ALUMINOSILICATE-ALUMINA COMPOSITION AND TRANSALKYLATION THEREWITH
Roy T. Mitsche, Island Lake, Ill., assignor to Universal Oil Products Company, Des Plaines, Ill., a corporation of Delaware
No Drawing. Filed Sept. 18, 1968, Ser. No. 760,691
Int. Cl. C01b *33/28;* C07c *3/50, 3/58*
U.S. Cl. 260—672                         11 Claims

ABSTRACT OF THE DISCLOSURE

A composition comprising as essential components thereof a crystalline aluminosilicate containing alumina fixed in combination therewith, and a method of preparation. The composition preferably comprises mordenite containing alumina fixed in combination therewith and is particularly effective as a catalyst with respect to the transalkylation or disproportionation of toluene to form benzene and polymethylbenzene products.

BACKGROUND OF THE INVENTION

Crystalline aluminosilicates, or zeolites, are well-known in the art and have found extensive application as hydrocarbon conversion catalysts or as a component thereof. They have been described as characterized by a three-dimensional network of fundamental structural units consisting of $SiO_4$ and $AlO_4$ tetrahedra interconnected by a mutual sharing of apical oxygen atoms. To effect a chemical balance, each $AlO_4$ tetrahedra has associated therewith a cation, usually sodium or other exchangeable cation. In most cases, the cation is subsequently exchanged with a hydrogen ion to yield the hydrogen or active form of the aluminosilicate. The $SiO_4$ and $AlO_4$ tetrahedra are arranged in a definite geometric pattern often visualized either in terms of chains, layers or polyhedra, all formed by the linking of the tetrahedra. In any case, the crystalline aluminosilicates comprise well defined intracrystalline dimensions including intracrystalline channels or pore openings whose narrowest cross section has essentially a uniform diameter. The various aluminosilicates may be classed by the geometric pattern of their framework with its attendant pore size, and by the silica/alumina mole ratio of which they are composed.

The crystalline aluminosilicates herein contemplated are of the tube-like variety and are characterized by pore openings of from about 3 to about 8 angstroms and a silica/alumina mole ratio of from about 6 to about 12. Mordenite is typical of the aluminosilicates of this invention. While mordenite is a naturally occurring aluminosilicate, a synthetic mordenite is available under the trade name Zeolon. Mordenite, caustic extracted mordenite, mordenite supported on or dispersed in a carrier material, and other variations and combinations of mordenite have been proposed, usually as catalysts for specific hydrocarbon conversion reactions. However, the art has not heretofore disclosed the composition of this invention, the novelty and utility of which is demonstrated by its extraordinary activity and stability as a catalyst with respect to the transalkylation or disproportionation of alkyl aromatic hydrocarbons, heretofore recognized as catalyzed by mordenite type catalysts.

The transalkylation or disproportionation of alkyl aromatic hydrocarbons is of particular importance in conjunction with catalytic reforming. In recent years, largely due to the success and growth of catalytic reforming and improved methods of separating and recovering aromatic hydrocarbons produced thereby, the petroleum industry has become a principal source of benzene, toluene, and other aromatic and alkyl aromatic hydrocarbons. The supply and demand for specific aromatic hydrocarbons varies from time to time. For example, it is not uncommon to find toluene in excess of demand while benzene is in short supply. To obviate this situation, it is desirable to treat the toluene at transalkylation or disproportionation conditions whereby one molecule is alkylated at the expense of another molecule which is dealkylated to yield benzene and xylenes or other polymethylated benzenes.

It is an object of the invention to present a new and useful composition of matter. It is a further object to present a novel method of preparing said composition of matter. It is a still further object to present an improved process for the transalkylation of alkyl aromatic hydrocarbons utilizing the novel composition of this invention as a catalyst therefor.

SUMMARY OF THE INVENTION

In one of its broad aspects, the present invention embodies a novel composition of matter comprising a crystalline aluminosilicate containing alumina fixed in combination therewith, said aluminosilicate being characterized by a silica/alumina mole ratio of from about 6 to about 12 and pore openings of from about 3 to about 8 angstroms, said aluminosilicate comprising from about 60 to about 90 weight percent of the composition.

One of the more specific embodiments relates to a novel composition of matter comprising hydrogen mordenite containing alumina fixed in combination therewith, said mordenite comprising from about 65 to about 75 weight percent of the composition.

Other objects and embodiments of this invention will become apparent with reference to the following detailed specification.

As will become apparent with reference to the method of preparation hereinafter presented, the composition of this invention comprises an aluminosilicate containing alumina fixed in physical and/or chemical combination therewith in contrast to the conventional practice of suspending the aluminosilicate in a refractory metal oxide. Thus, the present invention does not contemplate the presence of any substantial amount of extraneous alumina in the claimed composition. Accordingly, in another embodiment of this invention relating to a method of preparing said composition, the crystalline aluminosilicate, characterized by a silica/alumina mole ratio of from about 6 to about 12 and pore openings of from about 3 to about 8 angstroms, is heated in admixture with an alumina sol, said aluminosilicate being admixed with said sol prior to being dried at a temperature in excess of about 200° C. The supernatant or extraneous sol is thereafter separated and the aluminosilicate-alumina sol product treated at conditions effecting gelation of the sol. The aluminosilicate-alumina gel product is thereafter washed and dried.

The crystalline aluminosilicate is suitably heated in admixture with the alumina sol at a temperature of from about 50° C. to about 150° C. at conditions to obviate any substantial loss of water. Thus, the aluminosilicate and alumina sol may be heated together in a closed vessel. Preferably, the aluminosilicate and alumina sol are heated together at a temperature of from about 90° C. to about 110° C. under reflux conditions for a period of from about 1 to about 24 hours or more.

The alumina sol is preferably, although not necessarily, an aluminum chloride sol such as is prepared by digesting aluminum metal in an acidic reagent such as hydrochloric acid and/or aqueous aluminum chloride at about the boiling point of the mixture—usually a temperature of from about 175° F. to about 220° F. However, other alumina sols derived from other aluminum salts such as aluminum sulfate, aluminum nitrate, sodium aluminate, etc., can be employed.

The supernatant or extraneous alumina sol is decanted, filtered, or otherwise separated from the aluminosilicate-alumina sol product which is subsequently treated at conditions effecting gelation of the reacted sol. Typically, the aluminosilicate-alumina sol product is treated in contact with an aqueous ammonia solution whereby gelation of the sol occurs. The resulting aluminosilicate-alumina gel product is usually water-washed and dried at a temperature of from about 95° to about 300° C. for a period of from about 2 to about 24 hours or more. When the composition is to be employed as a catalyst, it is advantageously further calcined at a temperature of from about 475° to about 750° C., suitably in an air atmosphere, for a period of from about 0.5 to about 10 hours. The activity of the composition as a catalyst is favored by a calcination temperature in the lower range, say from about 475° to about 550° C.

It has been found that when, as aforesaid, the aluminosilicate is admixed with the alumina sol prior to being dried at a temperature in excess of about 200° C., and preferably prior to being dried at a temperature in excess of about 110° C., so as to retain volatile matter in excess of about 15%, the aluminosilicate embodies a peculiar affinity for alumina not otherwise observed. This peculiar affinity is evidenced by a greater capacity of the aluminosilicate for alumina fixed in physical and/or chemical combination therewith as herein contemplated. The peculiar affinity is further evident from the catalytic effect of the composition with respect to the aforementioned transalkylation reaction—a more than two-fold increase in activity and stability being realized. The composition of this invention preferably comprises the hydrogen form of the crystalline aluminosilicate. The aluminosilicates are normally produced or found in the sodium form. The hydrogen form is readily available by ion-exchange methods widely practiced in the art. Thus, the sodium form of the aluminosilicate is treated in contact with a dilute aqueous hydrochloric acid solution to effect a direct replacement of substantially all of the sodium cations with hydrogen cations. Alternatively, the aluminosilicate is treated in contact with an aqueous solution comprising a hydrogen cation precursor, usually ammonium cations, to replace substantially all of the sodium cations with ammonium cations which are converted to hydrogen cations by decomposition upon subsequent calcination. In the preparation of the composition in accordance with the method of this invention, it is preferred to convert the crystalline aluminosilicate to the hydrogen form or the ammonium form prior to admixture with the alumina sol. However, the desired ion-exchange can be suitably effected by treating the aluminosilicate-alumina gel product at ion-exchange conditions.

The present invention further embodies a process which comprises treating an alkyl aromatic hydrocarbon having from about 7 to about 15 carbon atoms per molecule at transalkylation conditions including a temperature of from about 200° C. to about 480° C. and a pressure of from about atmospheric to about 1500 pounds per square inch gauge (p.s.i.g.) in contact with a catalyst comprising essentially the composition of this invention, and forming products of higher and lower number of carbon atoms than said alkyl aromatic hydrocarbon. The preferred composition employed as a catalyst comprises alumina suspended in mordenite, said mordenite comprising from about 50 to about 75 weight percent of said composition.

The alkyl aromatic hydrocarbon feed stock treated in accordance with the present process can be a substantially pure alkyl aromatic hydrocarbon of from about 7 to about 15 carbon atoms, a mixture of such alkyl aromatic hydrocarbons, or a hydrocarbon fraction rich in said alkyl aromatics. Suitable alkyl aromatic hydrocarbons include alkyl benzenes and alkyl naphthalenes, preferably with an alkyl group of less than about 4 carbon atoms. The process is particularly applicable to the treatment of more difficultly transalkylatable toluene to form benzene, xylenes or other polymethylbenzenes.

The transalkylation, or disproportionation, reaction of this invention can be effected in contact with the catalyst composition of this invention in any conventional or otherwise covenient manner and may comprise a batch or a continuous type of operation. A preferred type of operation is of the continuous type. For example, the above described catalyst is disposed in a fixed bed in a reaction zone of a vertical tubular reactor and the alkyl aromatic feed stock charged in an upflow or downflow manner, the reaction zone being maintained at a temperature of from about 200° C. to about 480° C., preferably at a temperature of from about 220° to about 460° C. While pressure does not appear to be an important variable with respect to transalkylation reaction of this invention, the process is generally conducted in the presence of an imposed hydrogen pressure to provide from about 1 to about 10 moles of hydrogen per mole of hydrocarbon. However, there is no net consumption of hydrogen in the process, and the hydrogen charged is recovered from the reactor effluent and recycled.

The transalkylation reaction can be effected over a wide range of space velocities. In general, the process is conducted at a space velocity of from about 0.2 to about 10. Space velocities herein referred to are liquid hourly space velocities (LHSV) i.e., volume of charge per volume of catalyst per hour. While the present process is characterized by unusually high space velocities indicative of high activity, it is particularly noteworthy because of its relatively high stability at a high activity level.

The composition herein disclosed may be employed as a component of a catalyst comprising any of the several catalytically active metallic materials in the oxidized or reduced state. Of particular interest are those catalytic composites comprising one or more metals of Groups VIB and VIII including molybdenum, tungsten, chromium, iron, nickel, cobalt, platinum, palladium, ruthenium, rhodium, osmium and iridium. Thus, the composite of this invention can be utilized advantageously as a catalyst or component thereof to effect a variety of hydrocarbon conversion reactions involving reaction conditions comprising a temperature in the 70–1400° F. range. The catalysts are particularly useful in effecting the hydrocracking of heavy oils, including vacuum residuals, to form petroleum products in the middle distillate range utilizing a temperature of from about 500° F. to about 3,000° F. and pressures of from about 500 p.s.i.g. to about 1,000 p.s.i.g. Said hydrocarbon conversion reactions further include polymerization of olefins, particularly ethylene, propylene, 1-butene, 2-butene, isobutylene and also higher boiling olefins, at polymerization reaction conditions. The composite of this invention is also useful as a catalyst or component thereof in effecting the alkylation of isoparaffins with olefins or other alkylating agents including, for example, alkyl halides and the like; and also the alkylation of isobutane, isopentane, and/or isohexane with ethylene, propylene, 1-butene, etc., or mixtures thereof; and also the alkylation of aromatics with olefins or other alkylating agents, particularly the alkylation of benzene, toluene, etc., with propylene, butylene, and higher boiling olefins including nonenes, decenes, undecenes, etc., the foregoing alkylation reaction being effected at alkylation conditions disclosed in the art. The composition of this invention is further useful in the isomerization of paraffins, particularly n-butane, n-pentane, n-hexane, n-heptane, n-octane, etc., or mixtures thereof, including isomerization of less highly branch chain saturated hydrocarbons to more highly branched chain saturated hydrocarbons such as the isomerization of 2- or 3-methylpentane to 2,2- and 2,3-dimethylbutanes, isomerization of naphthenes, for example, the isomerization of dimethylcyclopentane, to methylcyclohexane, isomerization of methylcyclopentane, to cyclohexane etc., at isomerization reaction conditions. Other hydrocarbon conversion reactions including the reforming of naphtha to gasoline, dehydrogenation of ethylbenzene to styrene, and the hydrogenation of benzene to cyclohexane, are effectively catalyzed utilizing the composite of this invention as a catalyst or component thereof.

The following examples are presented in illustration of certain specific embodiments of this invention and are not intended as an undue limitation of the generally broad scope of the invention as set out in the appended claims.

EXAMPLE I

Alumina was fixed in combination within a synthetic hydrogen mordenite which had not previously been treated at temperatures in excess of about 100° C. and which included about 18 wt. percent volatile matter. The preparation consisting of heating 300 grams of said mordenite in about 700 cc. of an aluminum chloride hydrosol using a glass vessel equiped with an overhead reflux condenser. The aluminum chloride hydrosol comprised 12.03 wt. percent aluminum, 10.38 wt. percent chloride, and had a specific gravity of 1.3455. The mixture was heated for about 24 hours at reflux conditions (95–100° C.). Thereafter, the mordenite-sol product was recovered by filtration. The mordenite-sol product included about 325 cc. of sol. The mordenite-sol product was slurried with a 15% aqueous ammonia solution for about 1 hour and aged in the solution overnight. The resulting mordenite-gel product was thereafter further washed with dilute aqueous ammonia until the filtrate was chloride-free. The product was oven-dried at 110° C. pilled, and calcined at 550° C. The final product analyzed 71% mordenite and 29% alumina.

EXAMPLE II

The activity and the stability of the catalyst composition of Example I was determined with respect to the transalkylation of toluene. The toluene was charged downflow in contact with the catalyst composition at a liquid hourly space velocity of about 5 and at transalkylation conditions including a pressure of 500 p.s.i.g., a temperature of 420° C., and a hydrogen to hydrocarbon ratio of 10. The catalyst bed measured 50 cc. of 1/8" pills. During an initial test period of about 10 hours, a 40% conversion of toluene per pass was achieved. The product test analysis, in weight percent, included 60.2% unconverted toluene, 16.5% benzene, and 18.9% xylenes. After approximately 113 hours on stream, a catalyst sampling indicated 0.27% carbon on the catalyst. After about 30 days on stream at approximately the same transalkylation conditions, the toluene conversion and the product distribution was substantially unchanged.

EXAMPLE III

The synthetic hydrogen mordenite employed in the preparation of the catalyst composition of Example I was calcined at 550° C. for about 12 hours. About 100 cc. (74.4 grams) of the calcined mordenite was evaluated with respect to the transalkylation of toluene in the same manner employed with respect to the catalyst composition of Example I. Toluene was processed at transalkylation conditions including a pressure of 500 p.s.i.g., a temperature of 450° C., a LHSV of 1.0 in a hydrogen to hydrocarbon ratio of about 10. After about 15 hours on stream, the toluene conversion was about 25.7%. The product analysis, in weight percent, included 74.3% unreacted toluene, 9.0% benzene, 12.2% xylenes, 2.0% nonaromatic and 2.5% $C_9$ aromatics. After about 128 hours on stream, the toluene conversion had deteriorated to about 13.8%. The product analysis included 86.9% unreacted toluene, 4.4% benzene, 6.4% xylenes, 1.3% nonaromatics, and 1.0% $C_9$ aromatics.

I claim as my invention:

1. A composition consisting essentially of alumina and from about 60 to about 90 wt. percent of a crystalline aluminosilicate, said aluminosilicate being characterized by a $SiO_2/Al_2O_3$ mole ratio of about 6 to 12 and a pore diameter of about 3 to 8 angstroms, said composition having been prepared by admixing with an alumina sol a crystalline aluminosilicate characterized by a $SiO_2/Al_2O_3$ mole ratio of about 6 to 12 and a pore diameter of about 3 to 8 angstroms, said aluminosilicate being admixed with said sol prior to being dried at a temperature in excess of about 200° C., heating the resulting sol-aluminosilicate mixture at a temperature of about 50° C. to 150° C. for a period of about 1 to 24 hours, thereafter separating the supernatant sol and treating the aluminosilicate-sol product at conditions effecting gelation of the sol, and washing and drying the resulting aluminosilicate-gel product.

2. The composition of claim 1 further characterized in that said aluminosilicate is mordenite.

3. The composition of claim 2 further characterized in that said mordenite comprises from about 65 to about 75 wt. percent of said composition.

4. The composition of claim 3 further characterized in that said mordenite is the hydrogen form thereof.

5. The method of claim 2 further characterized in that said mordenite is admixed with said sol prior to being dried at a temperature in excess of about 100° C.

6. The method of claim 5 further characterized in that said mordenite is admixed with said sol as the hydrogen form thereof.

7. A process which comprises treating an alkyl aromatic hydrocarbon having from about 7 to about 15 carbon atoms per molecule at transalkylation conditions, including a temperature of from about 200° C. to about 480° C. and a pressure of from about atmospheric to about 100 atmospheres, in contact with a catalyst consisting essentially of the composition of claim 4, and forming products of higher and lower number of carbon atoms than said alkyl aromatic hydrocarbon.

8. The process of claim 7 further characterized in that said alkyl aromatic hydrocarbon is an alkylbenzene.

9. The process of claim 8 further characterized in that said alkylbenzene is toluene.

10. A process which comprises treating an alkyl aromatic hydrocarbon having from about 7 to about 15 carbon atoms per molecule at transalkylation conditions, including a temperature of from about 200° C. to about 480° C. and a pressure of from about atmospheric to about 100 atmospheres, in contact with a catalyst consisting essentially of the composition of claim 3 and forming products of higher and lower number of carbon atoms than said alkyl aromatic hydrocarbon.

11. A process which comprises treating an alkyl aromatic hydrocarbon having from about 7 to about 15 carbon atoms per molecule at transalkylation conditions, including a temperature of from about 200° C. to about 480° C. and a pressure of from about atmospheric to about 100 atmospheres, in contact with a catalyst consisting essentially of the composition of claim 1 and forming products of higher and lower number of carbon atoms than said alkyl aromatic hydrocarbon.

References Cited

UNITED STATES PATENTS

| | | | |
|---|---|---|---|
| 3,140,253 | 7/1964 | Plank et al. | 208—120 |
| 3,437,710 | 4/1969 | Pollitzer | 260—672 |
| 3,442,966 | 5/1969 | Pollitzer | 260—672 |

DELBERT E. GANTZ, Primary Examiner

G. E. SCHMITKONS, Assistant Examiner

U.S. Cl. X.R.

252—455